US010695854B2

United States Patent
Verrier

(10) Patent No.: US 10,695,854 B2
(45) Date of Patent: Jun. 30, 2020

(54) METHOD OF SEAMLESS BONDING AND DEVICE THEREFOR

(71) Applicant: PRATT & WHITNEY CANADA CORP., Longueuil (CA)

(72) Inventor: Pierre Verrier, Sainte-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 133 days.

(21) Appl. No.: 14/670,834

(22) Filed: Mar. 27, 2015

(65) Prior Publication Data
US 2015/0273627 A1   Oct. 1, 2015

Related U.S. Application Data

(60) Provisional application No. 61/971,606, filed on Mar. 28, 2014.

(51) Int. Cl.
| | |
|---|---|
| *B23K 3/08* | (2006.01) |
| *B23K 26/06* | (2014.01) |
| *B23K 26/0622* | (2014.01) |
| *B23K 26/142* | (2014.01) |
| *B23K 26/361* | (2014.01) |
| *B23K 1/00* | (2006.01) |
| *B23K 9/173* | (2006.01) |
| *B23K 26/08* | (2014.01) |
| *B23K 101/32* | (2006.01) |

(Continued)

(52) U.S. Cl.
CPC .............. *B23K 3/08* (2013.01); *B23K 1/0018* (2013.01); *B23K 9/167* (2013.01); *B23K 9/173* (2013.01); *B23K 26/0619* (2015.10); *B23K 26/0622* (2015.10); *B23K 26/083* (2013.01); *B23K 26/142* (2015.10); *B23K 26/361* (2015.10); *B23K 2101/001* (2018.08); *B23K 2101/32* (2018.08)

(58) Field of Classification Search
CPC ............ B23K 26/0619; B23K 26/0622; B23K 26/142; B23K 1/0018; B23K 9/167; B23K 9/173; B23K 26/083; B23K 26/362; B23K 2201/001; B23K 2201/32; B23K 3/08; B23K 26/0613; B23K 26/067; B23K 2201/34
USPC ...... 219/121.68, 69, 121.76, 121.73, 121.75; 216/65
See application file for complete search history.

(56) References Cited

U.S. PATENT DOCUMENTS

| | | | | |
|---|---|---|---|---|
| 4,149,063 A | * | 4/1979 | Bishel | B23K 35/304 219/137 WM |
| 6,653,592 B2 | * | 11/2003 | Andersen | B23K 26/0604 219/121.67 |

(Continued)

*Primary Examiner* — Dana Ross
*Assistant Examiner* — Joseph M Baillargeon
(74) *Attorney, Agent, or Firm* — Norton Rose Fulbright Canada LLP

(57) ABSTRACT

A method of seamless bonding comprises in sequence: feeding a filler wire into a de-scaling unit; removing with the de-scaling unit a contamination layer disposed onto a core of the filler wire, removing the contamination layer comprising: applying a laser beam to the filler wire at a wavelength causing at least a portion of the contamination layer to break away from the core of the filler wire while leaving the core unaffected; and feeding the filler wire to a seamless bonding unit. A seamless bonding device is also presented.

16 Claims, 6 Drawing Sheets

(51) Int. Cl.
   *B23K 101/00*   (2006.01)
   *B23K 9/167*   (2006.01)

(56) References Cited

U.S. PATENT DOCUMENTS

| | | | |
|---|---|---|---|
| 7,525,065 B2 * | 4/2009 | Engler | B08B 7/0042 |
| | | | 219/121.69 |
| 2002/0113115 A1 * | 8/2002 | Satoh | B23K 1/0056 |
| | | | 228/41 |
| 2008/0121248 A1 * | 5/2008 | Turco | A61L 2/08 |
| | | | 134/1 |
| 2009/0039141 A1 * | 2/2009 | Clauberg | B08B 7/00 |
| | | | 228/205 |
| 2011/0168679 A1 | 7/2011 | Qi et al. | |
| 2013/0105450 A1 | 2/2013 | Waldhoer et al. | |
| 2013/0087534 A1 | 4/2013 | Denney | |
| 2013/0087543 A1 | 4/2013 | Denney et al. | |

\* cited by examiner

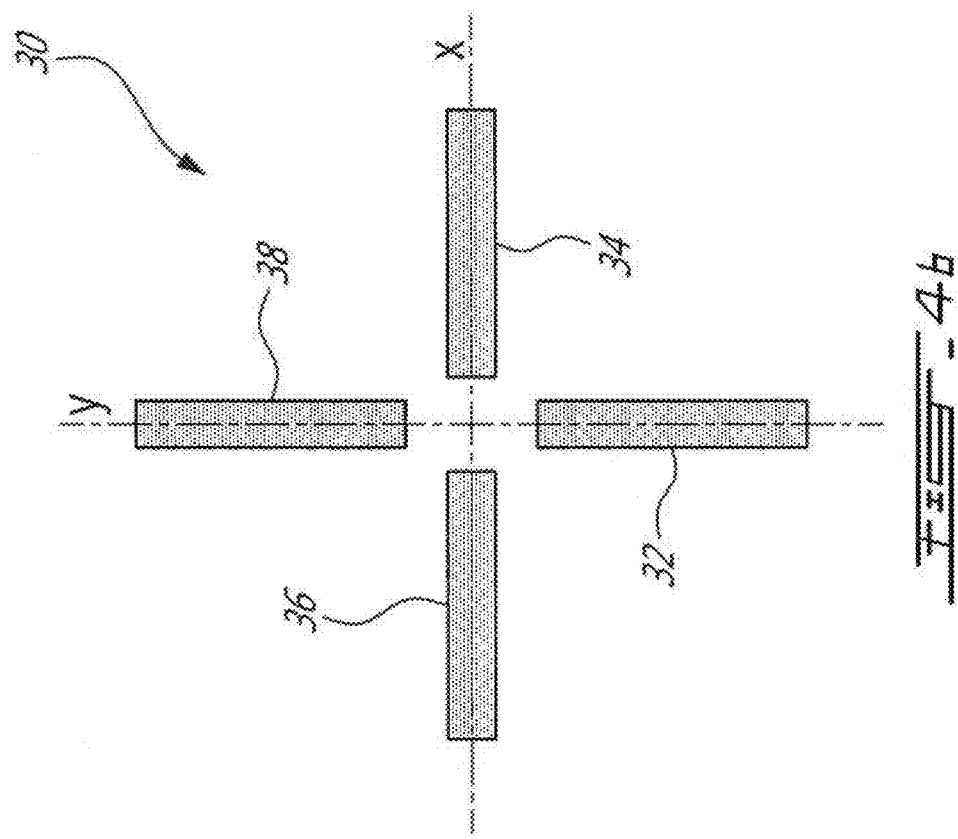
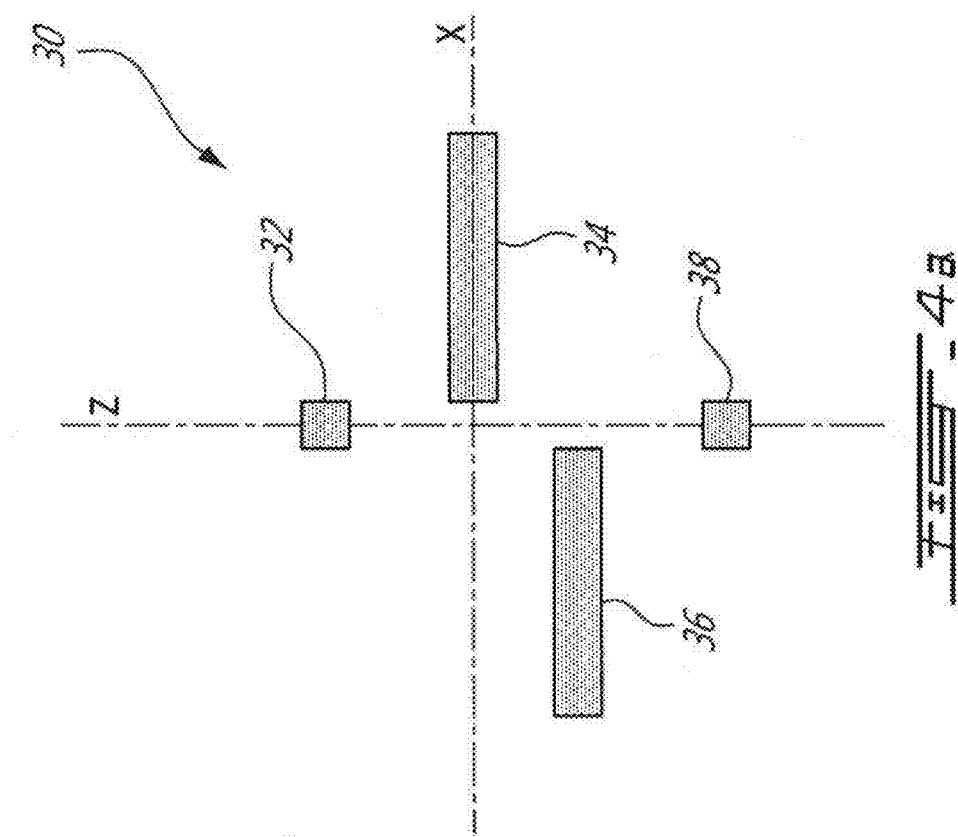

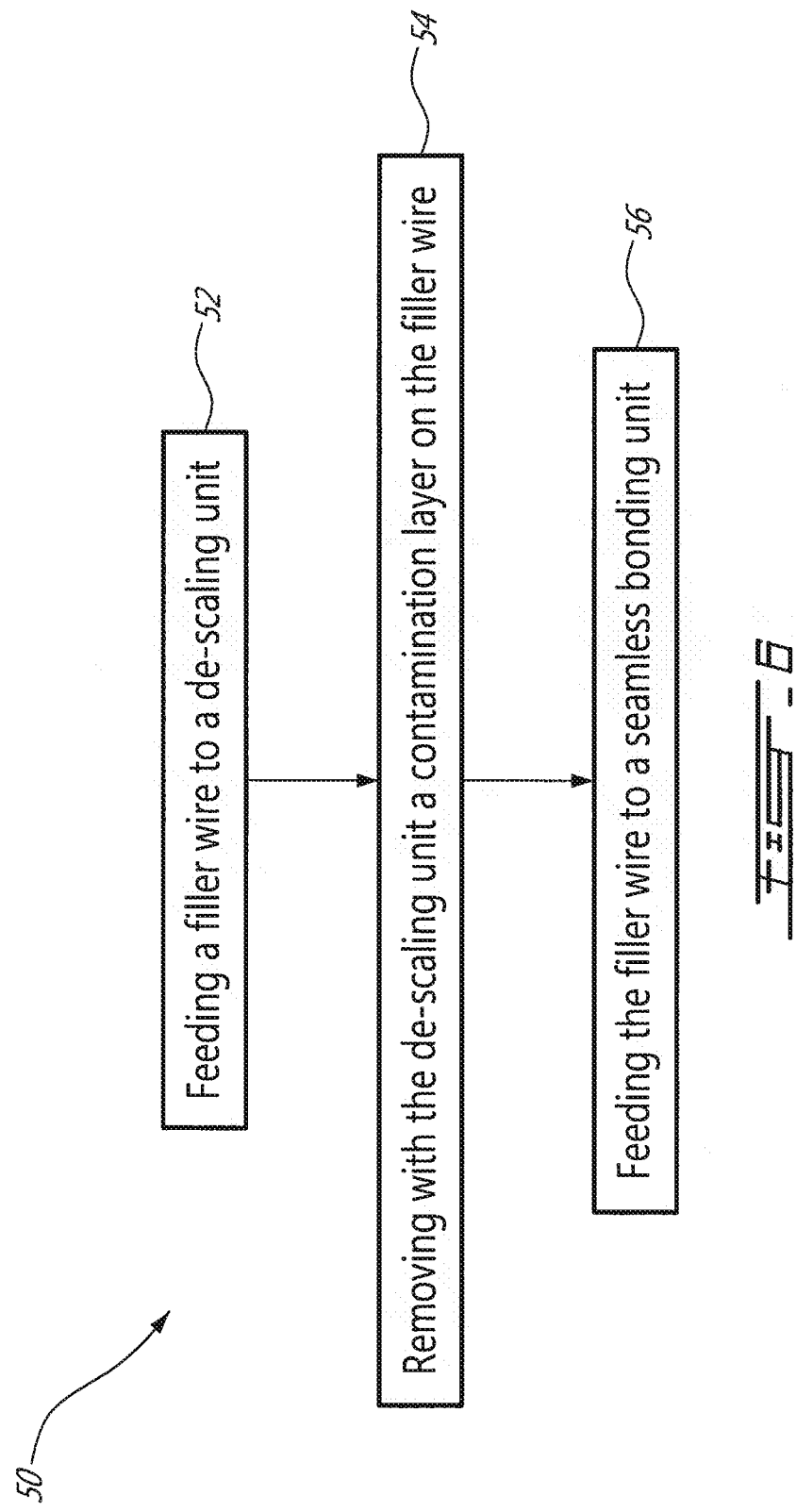

METHOD OF SEAMLESS BONDING AND DEVICE THEREFOR

CROSS-REFERENCE TO RELATED APPLICATION

This application claims priority to U.S. provisional application No. 61/971,606, filed Mar. 28, 2014, the entire contents of which are herein incorporated by reference.

TECHNICAL FIELD

The application relates generally to seamless bonding processes and, more particularly, to seamless bonding of components to be used in gas turbine engines.

BACKGROUND OF THE ART

Strength of seamless joints/bonds, such as welds, is function of several parameters including the materials used for the filler and the component to be joined. Some fillers have better bonding properties with a given component than other fillers. However, fillers may be covered by a contamination layer which may alter the strength of the joint/bond. For example, magnesium fillers may include an oxidation layer on their external surface. The oxidation layer may render the weld porous or in some cases which may impair the weld.

SUMMARY

In one aspect, there is provided a method of seamless bonding comprises in sequence: feeding a filler wire into a de-scaling unit; removing with the de-scaling unit a contamination layer disposed onto a core of the filler wire, removing the contamination layer comprising: applying a laser beam to the filler wire at a wavelength causing at least a portion of the contamination layer to break away from the core of the filler wire while leaving the core unaffected; and feeding the filler wire to a seamless bonding unit.

In another aspect, there is provided a seamless bonding device comprising: a de-scaling unit adapted to receive a filler wire moving therethrough, the de-scaling unit comprising: at least one optical fiber configured to emit a laser beam at a wavelength enabling breaking of the contamination layer from a core of the filler wire and removal of the contamination layer from the filler wire without affecting the core; and a seamless bonding unit disposed downstream of the de-scaling unit relative to the moving filler wire.

DESCRIPTION OF THE DRAWINGS

Reference is now made to the accompanying figures in which:

FIG. 4a is a longitudinal view of optical fibers of a de-scaling unit of the seamless bonding device of FIG. 3;

FIG. 4b is a top view of optical fibers of the de-scaling unit of FIG. 3;

FIG. 6 is a flow chart of a method of seamless bonding using the seamless bonding device of FIG. 3.

DETAILED DESCRIPTION

Figure 1:
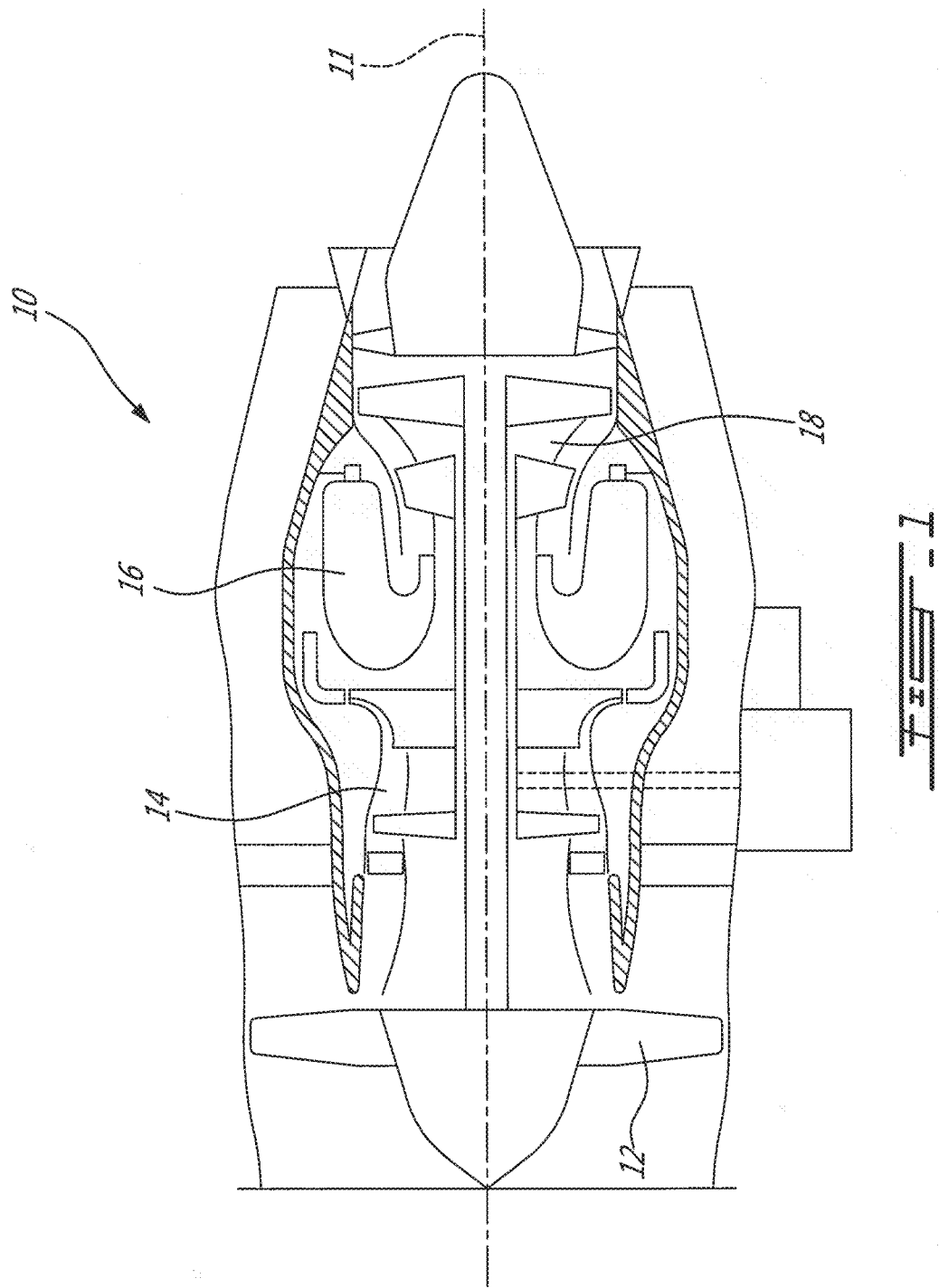
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14 and the turbine section 18 rotate about an axis 11.

Figure 2B:
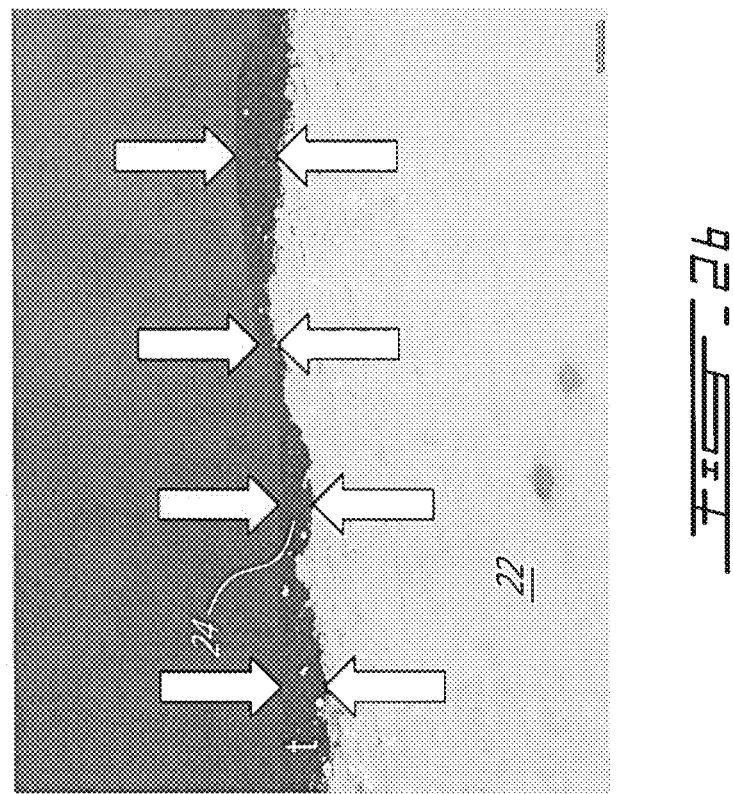
FIG. 2b is a photograph of a portion of a cross-sectional of the filler wire of FIG. 2a showing a contamination layer on the filler wire.
Figure 2A:
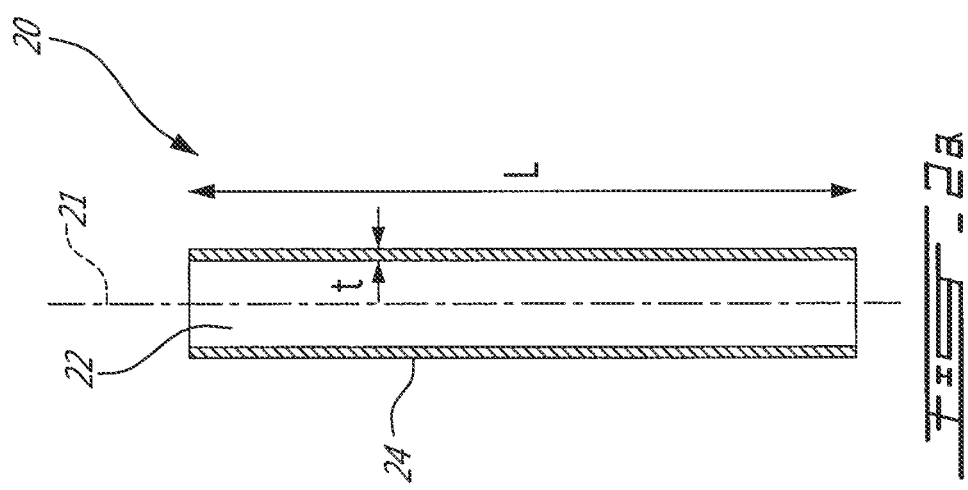
FIG. 2a is a schematic cross-sectional view of a filler wire.

Turning to FIG. 2a, a filler wire 20 for a seamless bonding process for components of a gas turbine engine, such as the gas turbine engine 10 of FIG. 1 is shown. In the particular embodiment shown herein, the filler wire 20 is used for a welding operation. The welding process may be used, for example, in casting repairs. Any casted component may be concerned. Such casting component may include non-exhaustively gear box, front housing, inlet case of the gas turbine engine 10. The filler wire 20 includes a core 22 (or substrate) made of a material used in the welding process. The core 22 may be covered by an external contamination layer 24. The contamination layer 24 is typically a material that is not desired in the welding process. In some cases, the material of the contamination layer 24 may compromise the welding process by inducing a porous weld or a not even allow the welding process to take place.

FIG. 2 shows schematically the core 22 and the contamination layer 24, while FIG. 2b shows a photograph of the core 22 and the contamination layer 24. In the embodiment shown, the core 22 is made of magnesium and the contamination layer 24 is an oxidation layer. The filler wire 20 may be made of various material depending on the seamless bonding process. For example, the filler wire 20 could be made of titanium or aluminum, and the contamination layer 24 could be dust. Arrows in FIG. 2b indicate a thickness t of the contamination layer 24, which is uneven throughout a length L of the filler wire 20. The contamination layer 24 may cover a portion or an entirety of an external surface of the core 22. The contamination layer 24 may or may not have a uniform thickness t throughout.

A predetermined amount of contamination may be set as an upper limit of allowed contamination. Above that limit one may want to remove at least a portion of the contamination layer 24 so as to be below the predetermined amount. In order to at least reduce an amount of the contamination layer 24, the filler wire 20 is subjected to a de-scaling operation before it is used in the seamless bonding process. The de-scaling operation is a laser blasting where at least a portion of the contamination layer 24 is removed so as to obtain a filler wire 20 made almost exclusively of the core 22.

Figure 3:
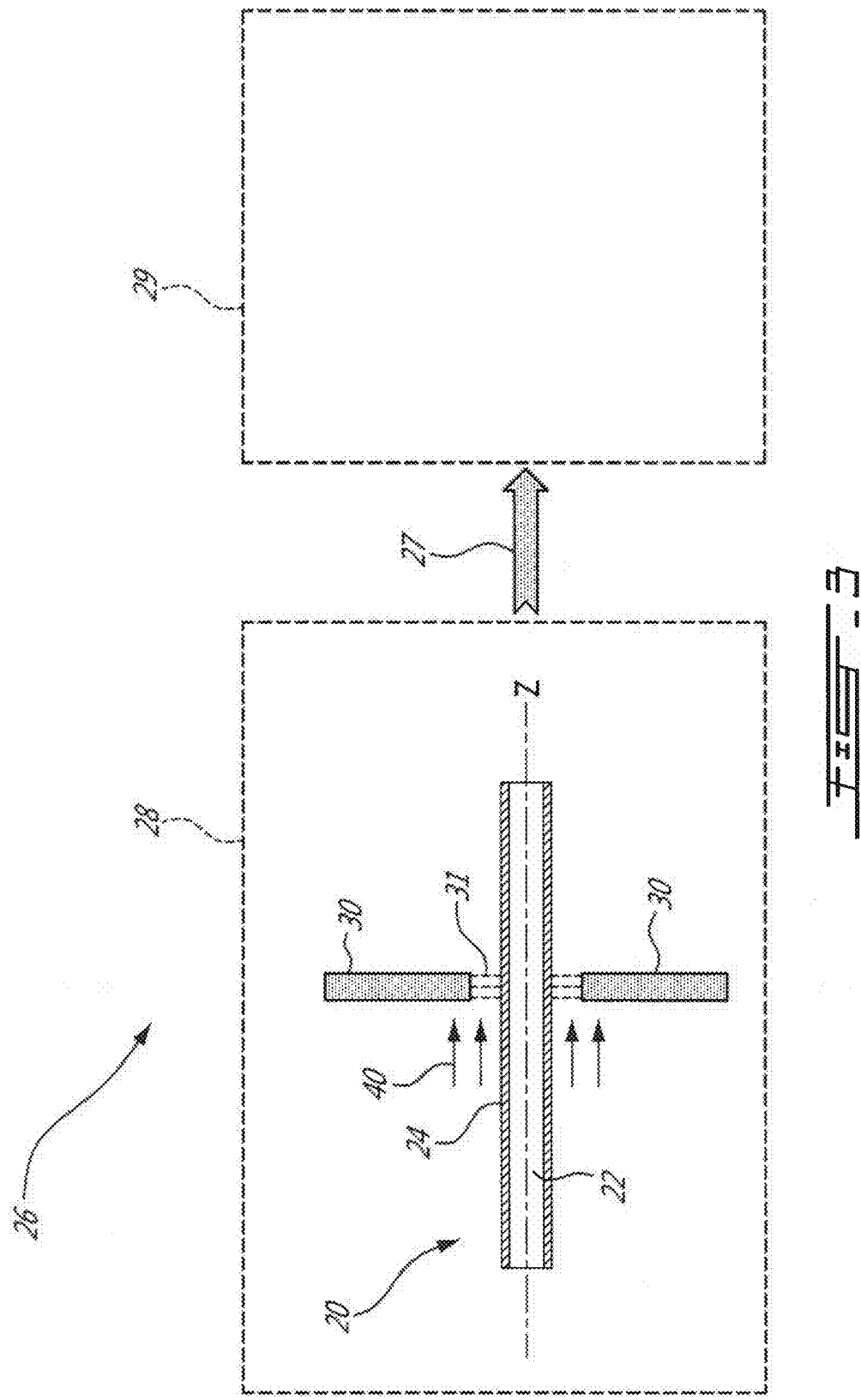
FIG. 3 is a schematic view of a portion of a seamless bonding device using the filler wire of FIG. 2.
Figure 5:
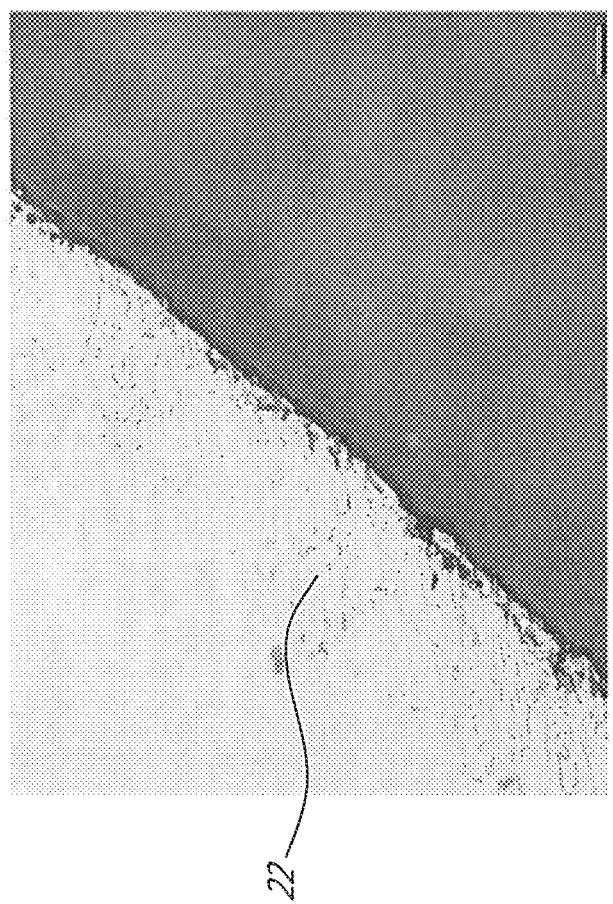
FIG. 5 is a photograph of a portion of a cross-sectional of the filler wire of FIG. 2a after having passed through the de-scaling unit.

Turning to FIGS. 3 to 5, a seamless bonding device 26 includes a de-scaling unit 28 and, in series, a seamless bonding unit 29.

The de-scaling unit 28 may include one or more optical fibers 30 emitting each a laser beam 31 directed toward the filler wire 20 and focused on a centerline 21 of the filler wire 20. The filler wire 20 is moved along the longitudinal axis z so as to expose various portions to the laser beam 31 and to be fed subsequently to the seamless bonding unit 29 (see arrow 27).

The laser beams 31 have a wavelength chosen in accordance with the material of the contamination layer 24 to enable de-scaling of the contamination layer 24. The action of the laser beams 31 induces a breaking of the contamination layer 24 and a removal of the contamination layer 24 from the core 22. The light emitted of the laser beams 31 is absorbed by the contamination layer 24 of the filler wire 20. The strong energy absorption may create a plasma (highly ionized and unstable gas) which may expands and create a shockwave. The shockwave fragments the contamination layer 24 into pieces and ejects the freed pieces. The light pulse may be chosen to be sufficiently short to avoid thermal phenomena, which may otherwise damage the core 22 of the filler wire 20. There may thus be a first energy threshold provided by the laser beams 31 below which no cleaning or de-scaling takes place, and a second energy threshold above which the core 22 is damaged by the laser beams 31. In one embodiment, the wavelength is 1.06 µm (near infrared) and the pulse duration is 10 nanoseconds. Each laser pulse may remove a certain thickness of the contamination layer 24. Depending on the thickness t, several pulses may be needed to remove the contamination layer 24 up to a desired level. A speed of travelling of the filler wire 20 may be controlled by the requirement of the seamless bonding unit 29 and the de-scaling unit 28 may be designed to accomplish de-scaling for the speed constraint of the seamless bonding unit 29, by for example, adjusting a number of optical fibers 30 or their strength.

As best seen in FIGS. 3, 4a and 4b, the filler wire 20 is disposed in the de-scaling unit 28 along a longitudinal axis z coinciding with its centerline 21, and the optical fibers 30 along perpendicular axes x, y. In one particular embodiment, the de-scaling unit 28 includes four optical fibers 32, 34, 36, 38, and each optical fibers 32, 34, 36, 38 is offset from one another along the longitudinal axis z (see FIG. 3a). Offsetting the laser beams 32, 34, 36, 38 prevents them from being face-to-face and destroy each other's effect and also to cover separate areas of the filler wire 20. In one embodiment, the optical fibers 32, 34, 36, 38 are disposed at 90 degrees form each other (see FIG. 3b). It is contemplated that the de-scaling unit 28 could include more or less than four optical fibers 32, 34, 36, 38. It is also contemplated that the optical fibers 32, 34, 36, 38 could not be disposed along the perpendicular axes x, y, but instead could be angles other than 90 degrees from each other. The optical fibers 32, 34, 36, 38 could also not be at a same angular position from each other. A number of optical fibers and their disposition relative to the filler wire 20 may be selected depending on a desired result. A higher number of optical fibers may result in a higher energy output which in turn may result in a higher de-scaling on the filler wire 20. In one example, the laser blasting device 30 could have several series of optical fibers, such as the optical fibers 32, 34, 36, 38, along the longitudinal axis z providing several removal stations to the filler wire 20. The series of optical fibers could be disposed at angles from each other along the perpendicular axes x, y.

To facilitate a removal of the freed pieces of the contamination layer 24 and of other environmental conditions such as smoke or other type of dirt, a flow of gas 40 (shown in FIG. 3) may optionally be projected onto the filler wire 20. In one embodiment, the flow of gas 40 is disposed close to the laser beams 31. In one embodiment, the flow of gas 40 is a flow of argon. The flow of gas 40 may be projected along the longitudinal axis z, or perpendicular to it, or at an angle with the longitudinal axis z. The flow of gas 40 may be disposed at a location of the laser beam 31 or downstream of the laser beam 31. The flow of gas 40 may be of any appropriate gas. The gas could for example be azote.

While the de-scaling unit 28 may be used on its own and the cleaned filler wire 20 may be stored before use, the de-scaling unit 28 could be part of the seamless bonding unit 29 so as to dress the filler wire 20 just before performing the welding operation or other seamless bonding operations. In one embodiment, the welding device is a Cold Metal Transfer (CMT) device, and the welding operation is a CMT operation. In one embodiment, the CMT device is a Fronius CMT Advance 4000. The incorporation of the de-scaling unit 28 into the welding device may provide an automatic one-step cleaning and welding process, where the de-scaling is achieved just upstream of the melting of the filler wire 20 in preparation of the welding. It is contemplated that the de-scaling unit 28 may be imported in welding devices other than the CMT device. Examples of such devices include a Tungsten Inert Gas welding (TIG) or Metal Inert Gas welding (MIG). It is also contemplated that the de-scaling unit 28 may be imported in seamless joint devices other than welding, such as brazing or soldering.

Turning now to FIG. 6, a method 50 of seamless bonding will be described.

The method 50 starts at step 52 with feeding the filler wire 20 to the de-scaling unit 28.

At step 54, the de-scaling unit 28 removes the contamination layer 24 disposed onto the core 22 of the filler wire 20. The laser beams 31 are applied to the filler wire 20 at a wavelength causing at least a portion of the contamination layer 24 to break away from the core 22 of the filler wire 20 into pieces. The wavelength may be predetermined or selected in other suitable fashion. In the embodiment where the core 22 is made of magnesium, a wavelength of 1.06 µm is chosen for its capacity to break into pieces at least a portion of the contamination layer 24 away from the core 22. By applying the laser beam 31 via one or more of the optical fibers 32, 34, 36, 38, at least a portion of the contamination layer 24 breaks away from the core 22 of the filler wire 20 into pieces. The filler wire 20 may travel at a constant velocity of 50-200 inches per minutes along the longitudinal axis z so as to expose the filler wire 20 to the laser beams 31 throughout its length L.

The flow of gas 40 may be projected onto the filler wire 20 so as to remove freed pieces of the contamination layer 24 from the filler wire 20. The flow of gas 40 may be more or less strong depending on how strong is a remaining bond between the contamination layer 24 and the core 22 after de-scaling. The flow of gas 40 may be disposed at a location of the laser beam 31 or downstream of the laser beam 31. The flow of gas 40 may be projected at the same time as the laser beams 31 or at a consequent time.

From step 54, the method 50 goes to step 56, where the filler wire 20 is fed to the seamless bonding unit 29. In one embodiment, the filler wire 20 may be melted in preparation of a welding operation right after passing through the de-scaling unit 28. The filler wire 20 may alternatively be stored after step 54 in preparation for a later performed welding operation.

The laser induce removal of the contamination layer and the integration in an automatic welding process such as the CMT device may lead to more accurate welding in terms of quality, stability and repeatability of the weld. The de-scaling unit 28 may be incorporated in existing welding devices with minimal modifications to the welding device. In addition, laser cleaning may be not abrasive, contact less and have no thermal effects. Laser cleaning may be environmental friendly: no substances or solvent may be added, no photochemical effects are produced and minimal amount of waste is collected. The above disclosed seamless bonding device allows seamless bonding and in particular welding using materials for the filler wire such as magnesium, aluminum and titanium which previously could not be used due to their rapid oxidation.

The above description is meant to be exemplary only, and one skilled in the art will recognize that changes may be made to the embodiments described without departing from the scope of the invention disclosed. While the de-scaling device and method for removing the contamination layer are shown herein a context of the aeronautics industry, it is contemplated that they could be used in a variety of industries where welding is required. Although welding is discussed herein, the method may be adaptable to other seamless joint/bonding processes such as brazing or soldering. Still, other modifications which fall within the scope of the present invention will be apparent to those skilled in the art, in light of a review of this disclosure, and such modifications are intended to fall within the appended claims.

The invention claimed is:

1. A method of seamlessly joining components, the method comprising, in sequence:
    feeding a filler wire to a de-scaling unit, the filler wire extending along a longitudinal axis, the de-scaling unit configured for moving the filler wire therethrough along the longitudinal axis;
    removing with the de-scaling unit an oxidation layer disposed onto an outer surface of a core of the filler wire, the oxidation layer being a layer forming on a material of the core as a result of an oxidation of the material of the core, removing the oxidation layer comprising:
        applying at least one laser beam to the filler wire at a wavelength causing at least a portion of the oxidation layer to break away from the core of the filler wire while leaving the core unaffected such that the non-oxidized material of the core is not removed by the at least one laser beam; and
    welding the components together with the filler wire fed to a welding unit.

2. The method as defined in claim 1, wherein removing the oxidation layer further comprises projecting a flow of gas onto the filler wire thereby pushing freed pieces of the oxidation layer away from the filler wire.

3. The method as defined in claim 1, wherein applying the at least one laser beam comprises applying two or more laser beams to the filler wire.

4. The method as defined in claim 1, comprising applying a plurality of laser beams to the filler wire to separate areas of the filler wire.

5. The method as defined in claim 1, wherein applying the at least one laser beam to the filler wire comprises applying four laser beams disposed at 90 degrees from each other around the filler wire.

6. The method as defined in claim 1, wherein feeding the filler wire to the welding unit comprises feeding the filler wire to the welding unit in series with the de-scaling unit.

7. The method according to claim 1, wherein removing with the de-scaling unit the oxidation layer includes selecting a wavelength of the laser beam as a function of the oxidation layer and of the core.

8. The method according to claim 1, wherein removing with the de-scaling unit the oxidation layer includes selecting a wavelength of the laser beam as a function of the oxidation layer and of the core.

9. A seamless bonding device comprising:
    a de-scaling unit adapted to receive a filler wire, the filler wire extending along a longitudinal axis, the de-scaling unit configured for moving the filler wire therethrough along the longitudinal axis, the de-scaling unit comprising:
        at least one optical fiber configured to emit at least one laser beam at a wavelength enabling breaking of an oxidation layer forming on a material of a core of the filler wire as a result of an oxidation of the material of the core, and removal of the oxidation layer from the filler wire without removing the non-oxidized material of the core; and
    a welding unit for joining components together using the filler wire, the welding unit disposed downstream of the de-scaling unit relative to the moving filler wire.

10. The seamless bonding device as defined in claim 9, further comprising a flow of gas adapted to be projected onto the filler wire, the flow of gas being configured to remove the freed pieces of the oxidation layer from the filler wire.

11. The seamless bonding device as defined in claim 10, wherein the flow of gas is a flow of argon.

12. The seamless bonding device as defined in claim 9, wherein the filler wire has a magnesium core.

13. The seamless bonding device as defined in claim 9, wherein the at least one optical fiber includes four optical fibers disposed at 90 degrees from each other.

14. The method according to claim 9, further comprising means to select a wavelength of the laser beam as a function of the oxidation layer and of the core.

15. A method of seamlessly joining components, the method comprising, in sequence:
    feeding a filler wire having a magnesium core to a de-scaling unit, the filler wire extending along a longitudinal axis, the de-scaling unit configured for moving the filler wire therethrough along the longitudinal axis;
    removing with the de-scaling unit an oxidation layer disposed onto the magnesium core of the filler wire, the oxidation layer being a layer forming on the magnesium core as a result of an oxidation of the magnesium core, removing the oxidation layer comprising:
        applying a laser beam to the filler wire at a wavelength causing at least a portion of the oxidation layer to break away from the magnesium core of the filler wire while leaving the magnesium core unaffected such that only the oxidation layer is removed by the at least one laser beam; and
    seamlessly welding the components together with the filler wire.

16. The method of claim 15, wherein applying a laser beam comprises applying at least two laser beams to the filler wire, a first one of the at least two laser beams being at a first longitudinal position relative to the longitudinal axis, a second one of the at least two laser beams being at a second longitudinal position relative to the longitudinal axis, wherein the first longitudinal position is longitudinally offset from the second longitudinal position.

* * * * *